United States Patent
Grimsley et al.

(10) Patent No.: US 7,225,516 B1
(45) Date of Patent: Jun. 5, 2007

(54) SLIDE ASSEMBLY FIXTURE FOR REAR HUB ASSEMBLY

(75) Inventors: Meridith Grimsley, Birmingham, AL (US); Terry Coker, Oxford, AL (US)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 11/202,754

(22) Filed: Aug. 12, 2005

(51) Int. Cl.
*B23Q 3/18* (2006.01)

(52) U.S. Cl. .......... 29/281.1; 269/58; 269/259

(58) Field of Classification Search ........ 269/43, 269/58, 59, 60, 259; 29/281.1, 281.3, 894.361
See application file for complete search history.

(56) References Cited

U.S. PATENT DOCUMENTS

| | | | |
|---|---|---|---|
| 4,671,144 A * | 6/1987 | Zeller | 81/488 |
| 5,341,717 A | 8/1994 | Feldman | |
| 5,618,228 A | 4/1997 | Anderson | |
| 6,158,730 A * | 12/2000 | Coffey | 269/236 |
| 6,212,981 B1 | 4/2001 | Brinker et al. | |
| 6,439,561 B1 | 8/2002 | Ausilio | |
| 6,634,266 B2 | 10/2003 | Brinker et al. | |
| 6,644,637 B1 | 11/2003 | Shen et al. | |
| 6,672,578 B1 * | 1/2004 | Martens | 269/282 |
| 7,134,650 B2 * | 11/2006 | Trudel et al. | 269/138 |
| 2004/0080087 A1 | 4/2004 | Lin et al. | |
| 2004/0194315 A1 | 10/2004 | Brinker et al. | |

* cited by examiner

*Primary Examiner*—Jacob K. Ackun, Jr.
(74) *Attorney, Agent, or Firm*—Rankin, Hill, Porter & Clark LLP; Vincent Ciamacco

(57) ABSTRACT

A fixture is provided for supporting a vehicle hub assembly during manufacturing operations that include rotating the assembly. The fixture includes a base with an upper surface, a linearly movable housing slidably supported on the base, an adjustable support block defining two selectable bores, each for slidably receiving a stud from one of two corresponding hub assembly types, and a handle for sliding the housing along the base. An operator checks the type of hub assembly to be worked on and rotates the support block if necessary to select the proper bore. The operator then slides the housing, causing the bore in the support block to slidably engage the stud. Each bore is configured within the support block so as to be accurately aligned with a stud on a corresponding hub assembly when supported in a jig, thus, allowing repeated fixture and hub assembly engagement without any additional adjustments.

16 Claims, 3 Drawing Sheets

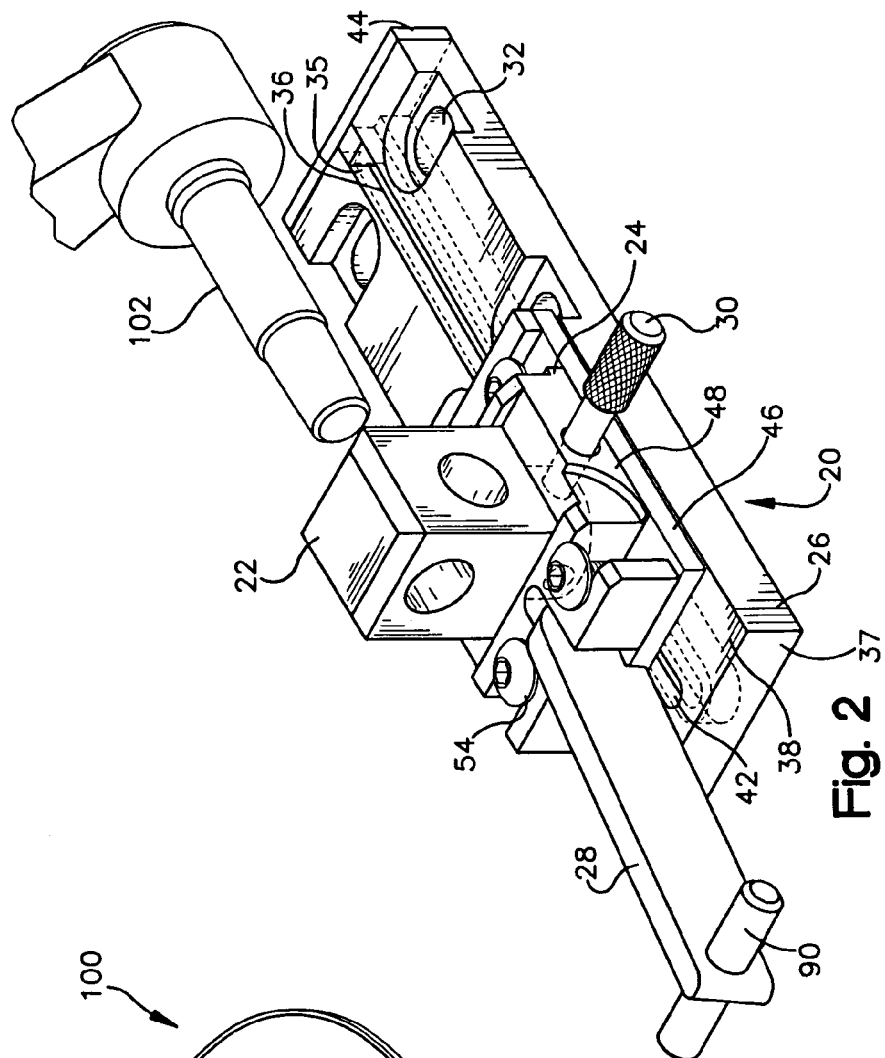
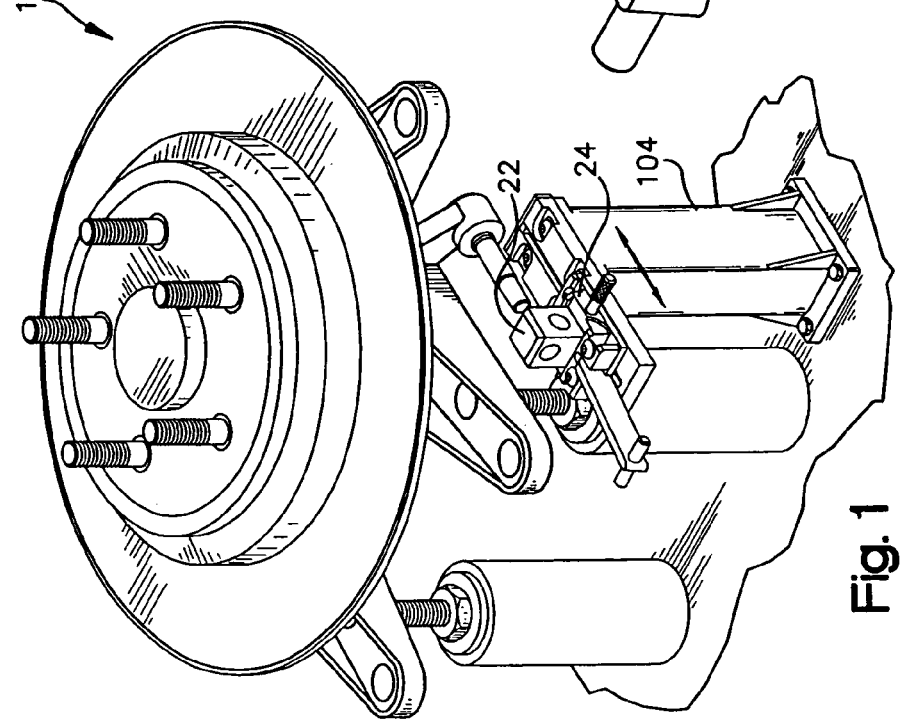
Fig. 1
Fig. 2

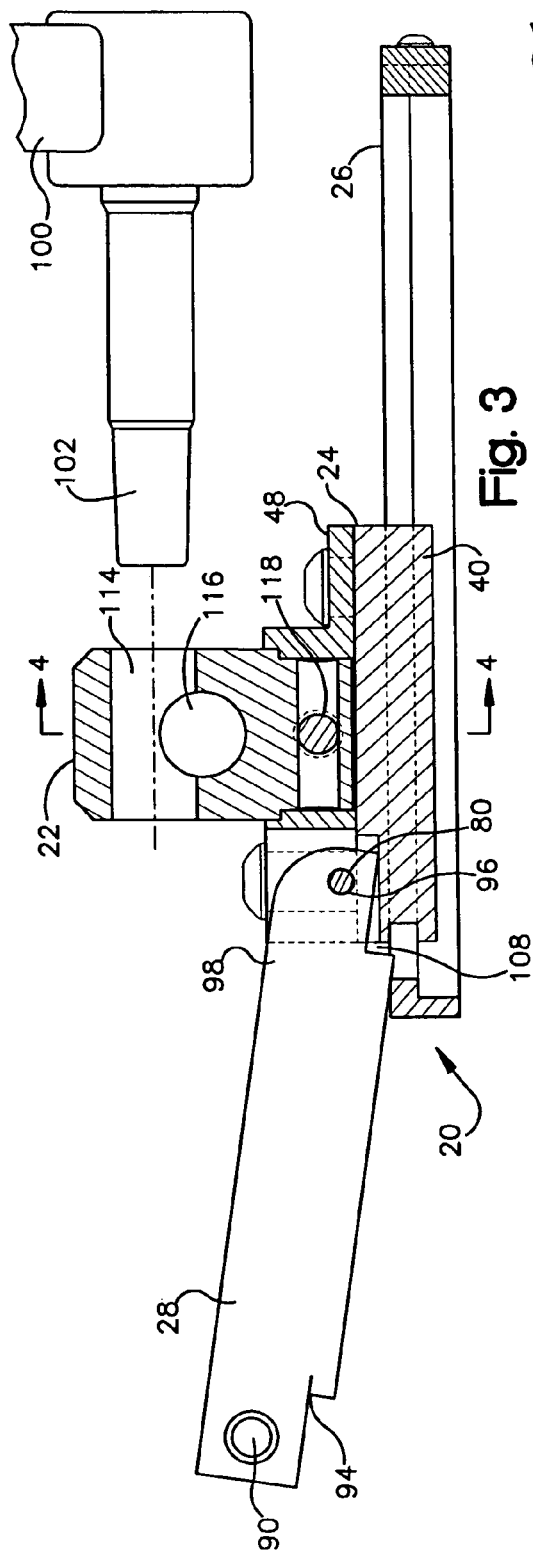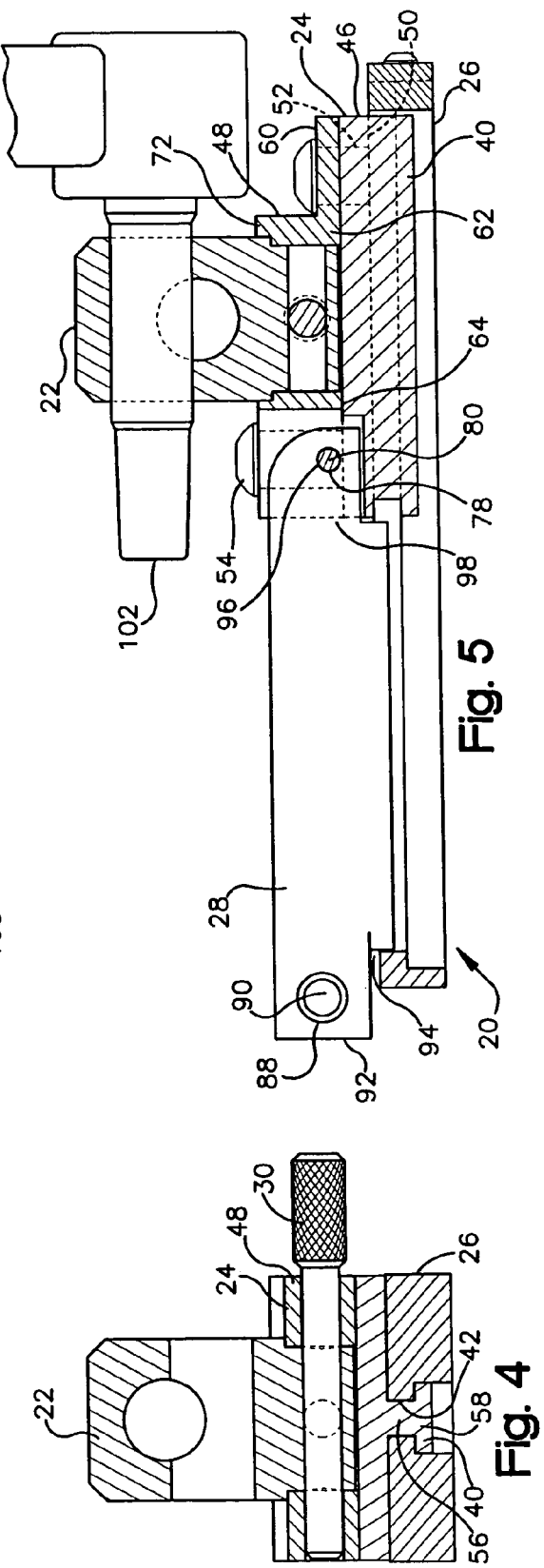

SLIDE ASSEMBLY FIXTURE FOR REAR HUB ASSEMBLY

BACKGROUND OF THE INVENTION

Fixtures have been used for years on assembly lines and workbenches to increase manufacturing speeds, and as a result overall productivity. Typical fixtures aid, for example, in welding, brazing, screw attachment and sub assembly installation processes. In operations where the part being manipulated is heavy, fixtures play an additional role of providing support. This support is important to prevent injury to workers performing assembly operations. An assembly worker who can avoid prolonged movement of heavy objects or having to significantly change position (through crouching, reaching, etc.) is less apt to become injured on the job.

One drawback inherent to fixtures is added clutter in the manufacturing area due to the presence of the fixture. Additionally, the part being manipulated must be loaded into and out of the fixture, preferably with little time and effort. The most efficient fixtures are small and can be loaded and unloaded very quickly. In order to maximize the efficiency of assembly lines, often more than one product model is assembled on a single assembly line. Thus, fixtures that can support multiple sized or shaped parts with little or no additional set up time are preferred.

Automobile manufacture utilizes assembly lines extensively. The assembly lines often support more than one type of vehicle. Additionally, vehicle components are often heavy and difficult to move or shift in order to complete operations thereon. What is desired in the present case is an efficient fixture for use in supporting the hub assembly of a vehicle so the hub assembly may be moved between multiple positions. The fixture, itself, should be easily moved from a use position to a position of non-use and moved out of the assembly area if desired.

BRIEF SUMMARY OF THE INVENTION

The present invention satisfies the requirements indicated above. The fixture of the present invention provides an easily adjustable device wherein the appropriate position of a support block on the fixture may be placed in line with a stud on a vehicle hub assembly. As a result, a single fixture of the present invention can be used on different vehicle types.

In accordance with the present invention, a fixture for supporting a vehicle hub assembly moved between multiple positions is provided and includes a base having an upper surface, a linearly movable housing, slidably supported on the base, an adjustable support block supported by the movable housing, the support block defining one or more bores for slidably receiving different sized studs from different hub assembly types, and a handle for assisting in slidably moving the housing along the base.

In accordance with a method of using the inventive fixture, the vehicle hub assembly is put in place on a common jig with the fixture when the fixture is in a retracted position. The operator then moves the fixture into an engaging position by grasping the handle on the fixture and slidably moving the housing until the fixture support block fits over the stud on the hub assembly, preferably the rear hub assembly of the vehicle. The hub assembly can then be rotated about the stud, as needed, to perform operations such as tightening fasteners located in different positions on the hub assembly.

These and other features, aspects and advantages of the present invention will be fully described by the following description, appended claims, and accompanying drawings.

BRIEF DESCRIPTION OF THE FIGURES

FIG. 1 is a first perspective view of a hub assembly and fixture attached to an assembly line jig;

FIG. 2 is a perspective view of the fixture of the present invention;

FIG. 3 is a cross sectional view of the fixture in a disengaged position;

FIG. 4 is a cross sectional view across the width of the fixture;

FIG. 5 is a cross sectional view of the fixture in an engaged position;

DETAILED DESCRIPTION OF THE INVENTION

Figure 7:
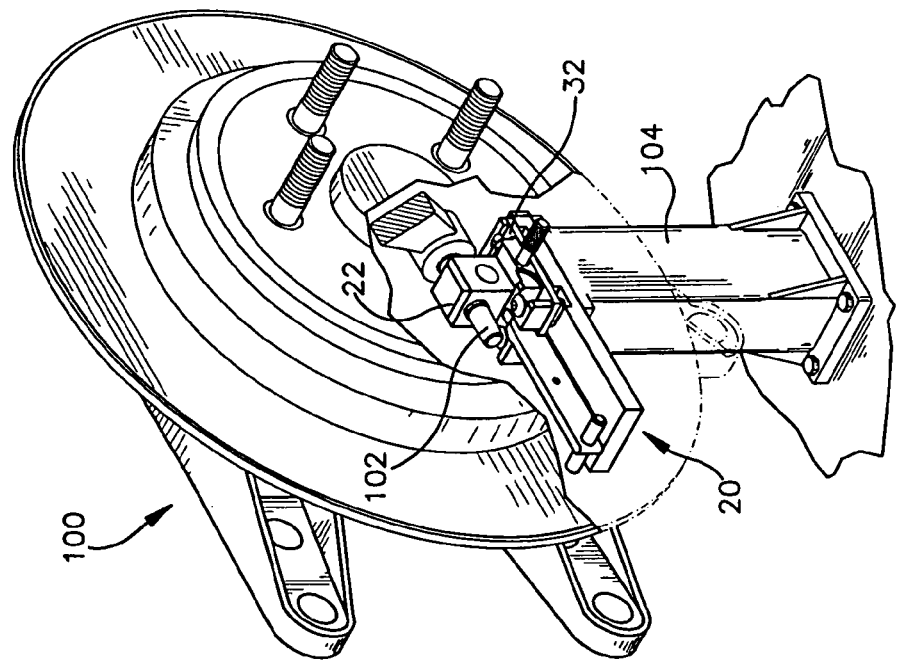
FIG. 7 is a second perspective view of a hub assembly and fixture attached to an assembly line jig.

Referring to the drawings, a preferred slide assembly fixture 20 according to the present invention is illustrated. The fixture 20 includes a reconfigurable support block 22 supported on a linearly movable housing 24 that allows the support block 22 to be placed around and easily removed from a stud 102 upon the hub assembly 100 of a vehicle during vehicle manufacture. As described in more detail below, the fixture 20 additionally includes a base 26, a handle 28 for moving the housing 24, and a locking pin 30 for holding the support block 22 in a desired configuration.

Referring to FIGS. 1 and 2, the base 26 is formed from a generally rectangular plate including mounting holes 32 and a channel 36. The plate is provided with four counter sunk mounting holes 32 that extend therethrough. The holes 32 preferably are transverse slots, as illustrated, to provide for an ability to adjust the position of the fixture 20. Bolts are placed through the holes 32 to mount the fixture 20 to a jig 104 or other support when in use. The base 26 also includes a linear channel 36 proceeding along the length of the base 26 and centered across the width of the base 26. The channel 36 has a narrow width at an upper surface 38 of the base, but widens laterally via a step approximately halfway through the thickness of the base 26, forming the shape of an inverted "T". The channel 36 extends from a first end 35, along the length of the base 26, to a point 42 a short distance from a second end 37 of the base 26. The channel 36 is a guide for a flange 40 (see FIG. 4) on the linearly movable housing 24 that is slidably received within the channel 36. An end cap 44 is fixed to the first end 35 of the base 26 close the open end of the channel and thereby retaining the base 26.

Figure 6:
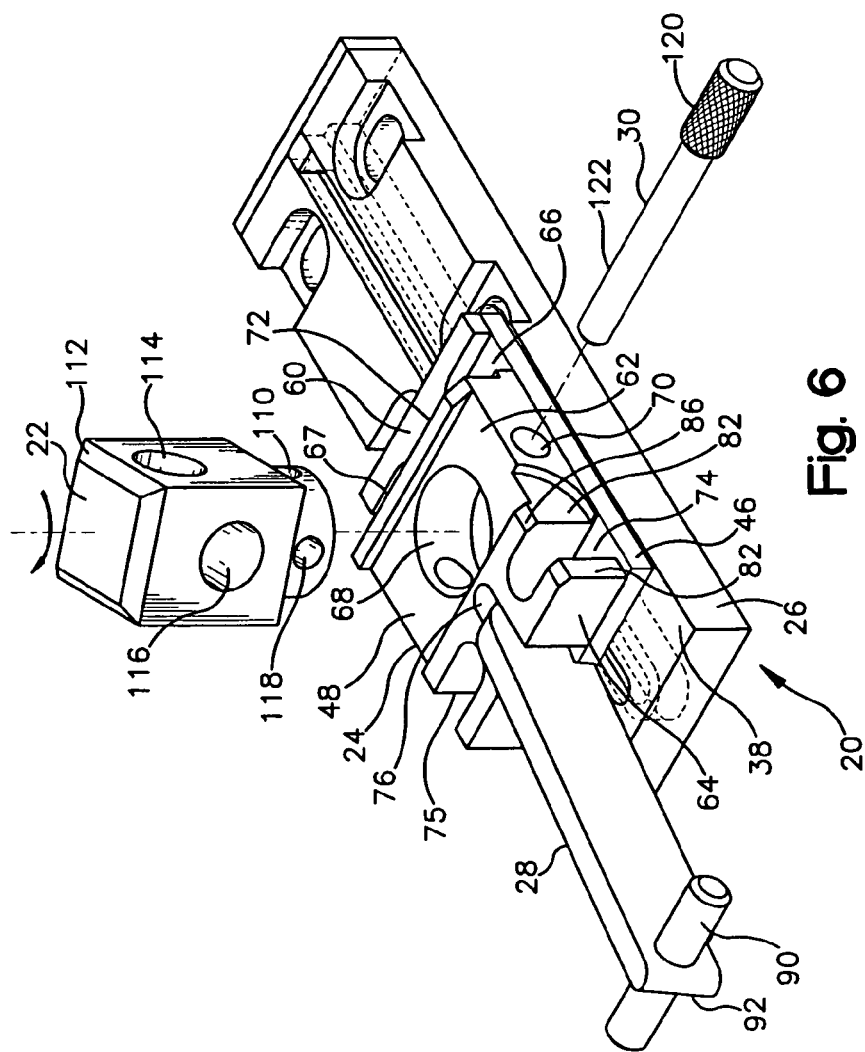
FIG. 6 is a perspective view of the fixture showing adjustment of the support block.

Referring to FIGS. 4, 5 and 6, the housing 24 is preferably formed in two sections, a slider 46 and a frame 48. The slider 46 is a generally rectangular plate having a flat bottom 50 from which the flange 40 projects. The flat bottom 50 of the slider is smooth permitting the slider 46 to easily move over the upper surface 38 of the base 26. The slider 46 defines four apertures 52 through its thickness. The apertures 52 are threaded, allowing screws 54 to hold the slider 46 and frame 48 together. The flange 40 has a narrow vertical post 56 and a wider crosspiece 58 on a side of the vertical post 56 opposite from the slider plate 46. The flange 40 extends the full length of the slider 46 and, has an inverted "T" shape, matching the shape of the accommodating channel 36. The crosspiece 58 of the flange 40 is preferably rounded at one end to allow easy assembly of the housing 24 into the base 26.

Referring to FIGS. 5 and 6 the frame 48 of the housing 24 is also rectangular shaped, in general, and fits directly over the slider 46. The frame 48 defines three sections 60, 62, 64 of varying heights or thickness along its length. At a first end is a first section 60 of narrow thickness. The first section 60 defines two transverse slots 66 and 67 that are aligned across the width of the first section 60 and that terminate at opposite sides of the frame 48. The slots 66, 67 provide a seat for the screws 54 that hold that slider 46 and frame 48 together and allow passage of the screws 54 therethrough. The slots 66, 67 may instead be holes. The second section 62, adjacent to the first section 60, defines a large central bore 68 through the thickness of the second section 62. The second section 62 also defines a second bore 70 extending from one side of the second section 62 to the central bore 68. A narrow raised ridge 72 protrudes from the edge of second section 62 immediately adjacent to the first section 60 and runs the width of the second section 62.

The third section 64 is adjacent to the second section 62 and has a thickness slightly greater than the second section 62. The third section 64, like the first section 60, defines first and second transverse slots 74, 75 that are aligned across the width of the third section 64 and terminate at opposite sides of the frame 48. The third section 64 also defines a third slot 76, perpendicular to the two transverse slots 74, 75 and that terminates at an end of the frame 48. An aperture 78 is formed in the third section 64 of the frame 48 extending from an inner surface of the first transverse slot 74 to an inner surface of the second transverse slot 75 and intersecting the third slot 76. The aperture 78 receives a pin 80 that pivotally secures the handle 28 to the housing 24. The width of the frame 48 is slightly reduced on a first side 82 of the third section 64. The first side 82 of the third section 64 is machined to produce a section of reduced width. The top edge 86 of the third section 64, in this area of reduced width, is beveled. The area of reduced width 82 of the frame 48 extends from the third section 64 into the adjacent second section 62.

Preferably the three sections 60, 62 and 64 of the frame 48 are form from a single piece of material.

The handle 28 is a long generally rectangular member including transverse apertures at each end thereof and a cross pin. A transverse aperture 88 is defined at a first end 92 of the handle 28 and receives a cross pin 90 that is grasped by a user. The first end 92 of the handle is rounded and a notch 94 is removed from the bottom of the first end. The notch 94 allows the housing to be locked in a position engaged with the hub assembly. Referring to FIG. 3, a transverse aperture 96 is defined at the second end 98 of the handle 28 as well and a notch 108 is also removed from the bottom of the second end 98. The top edge of the second end 98 of the handle 28 is rounded. The aperture 96 in the second end 98 of the handle 28 holds the pin 80, described above, that is received in the aperture 78 in the third section 64 of the frame 48.

Referring to FIGS. 3 and 6, the support block 22 has, in general, a cube shape with an additional circular post 110 protruding from the bottom on the cube. The edges 112 constituting the upper perimeter of the cube are beveled. A first bore 114 is defined transversely through two opposite sides of the cube. The first bore 114 is sized to closely receive a first stud 102 from the hub assembly 100 of a specific vehicle model. A second bore 116 is defined transversely through the remaining two opposite sides of the cube. The second bore 116 is sized to closely receive a second stud from the hub assembly of a second, different type of vehicle. The first and second bores 114 and 116 have different diameters and are located at different heights on the support block so as to be properly aligned with the associated studs. Two locking bores 118 are also defined within the post 110 of the support block 22. The locking bores 118 extend radially through the post 110 and are aligned with axes passing through the first and second bores, 114 and 116 respectively, in the cube portion of the support block 22.

The locking pin 30 is a cylindrical shaped piece having first and second sections 120, 122 with different diameters. The first section 120 is at a distal end of the pin 30, and is grasped by the user and may include a knurled surface. The second section 122 has a smaller diameter and is smooth so the locking pin may be smoothly inserted into the locking bore 118 on the post 110 of the support block 22.

Referring to FIG. 1, the hub assembly 100, preferably the rear hub assembly, is a structure, typically on an automobile, that is well known in the art and supports one of the two rear wheels on the automobile.

Referring to FIGS. 2 and 5, to assemble the fixture 20 of the present invention, the handle 28 is attached to the frame 48 by fitting the pin 80 through the aperture 78 in the third section 64. The cross pin 90 is also placed through the aperture 88 of the handle 28. The frame 48 is then fixed to the slider 46 using four screws 54. The end cap 44 is removed from the base 26 and the housing 24 slid into place. Specifically, the flange 40 on the housing 24 is fit into the channel 36 of the base 26. The end cap 44 is then replaced on the base 26. The support block 22 is then fitted into the housing 24. The support block 22 fits between the raised ridge 72 of the second section of the frame 48 and the third section 64 of the frame 48.

Referring to FIGS. 1 and 7, during the assembly of a vehicle, typically an automobile, it is necessary to tighten a number of fasteners on a hub assembly 100. This task is done at a dedicated jig 104 on an assembly line. In order to perform all of the necessary tightening operations, the position of the hub assembly 100 is rotated using a lifting device, such as a hoist (not shown). In order to secure the hub assembly 100 during the lifting operation and the tightening operations, the fixture 20 of the present invention is used. The fixture 20 allows for rotational movement of the hub assembly 100, without extraneous movement such as swinging, or the need for the operator to support or steady the hub assembly 100.

The first step in the operation is loading the hub assembly 100 as well as the fixture 20 onto the jig 104 on the assembly line. The hub assembly 100 is loaded in a manner well known to those skilled in the art. The base of the fixture 20 is also mounted to the jig 104 using four bolts that extend through openings 32. The linearly movable housing 24 of the fixture 20 must be in a fully retracted position (see FIG. 1) so there is no interference between the fixture 20 and the hub assembly 100 when the hub assembly 100 is attached to the jig 104 while the fixture 20 is already in place.

After the hub assembly 100 and fixture 20 are in place, the operator confirms that the support block 22 on the fixture 20 is in the proper position for the type of hub assembly being assembled. If the support block 22 is not in the proper portion, it must be rotated. Referring to FIG. 6, to rotate the support block 22, the operator first removes the locking pin 30 that passes through the frame 48 of the housing 24 and into the locking bore 118 of the post 110 of the support block 22. After the locking pin 30 is removed, the support block 22 is lifted slightly and is free to be rotated. The support block 22 is rotated so that the first bore 114 in the support block 22 is aligned with the stud 102 on the hub assembly 100 and the second bore 116 is moved out of alignment (or vise-versa depending on the original starting position). The locking pin 30 is then replaced to retain the support block 22 in the desired orientation.

Referring to FIGS. 5 and 7, the support block 22 must next be moved into position to secure the hub assembly 100. The support block 22 is fixed to the housing 24 and the housing 24 can be slid along the base 26 of the fixture 20. The operator grasps the handle 28 and pushes the housing 24 along the base 26 until the stud 102 on the hub assembly 100 passes through the associated bore 114 or 116 of the support block 22. Because the housing 24 includes a flange 40 protruding out of the bottom that rides within the channel 42 defined by the base 26, there is no way that the housing 24 will jump out of alignment with the hub assembly 100. The handle 28 is pushed downward into the channel 36. The notch 94 abuts the end of the channel 36 and prevents movement of the housing when the handle is pushed down and the housing in an engaged position. Once the support block 22 is in place, the operator can begin the operation of tightening fasteners on the hub assembly 100. When the hub assembly 100 must be rotated to access some of the fasteners, a lifting device is simply attached to the hub assembly 100 opposite the stud 102 that is engaged with the fixture. As the hub assembly 100 is lifted, it rotates, preferably ninety degrees. The hub assembly rotates 100 around the stud 102 and fixture 20 which remain stationary.

After all necessary fastener tightening steps have been taken, the hub assembly 100 is lowered back into the initial position. Referring to FIG. 3, the hub assembly 100 is released from the fixture 20 when the operator again grasps the handle 28, lifts the handle out of its locked position, and pulls the housing 24 from one end of the base 26 to the opposite end. Movement of the housing 24 stops when the flange 40 reaches the end of the channel 42 in the base 26. Once the hub assembly stud 102 has been removed from the support block 22, the hub assembly 100 may be removed from the jig 104 and advanced to the next stage of the assembly line.

The process is then repeated with a new hub assembly 100. If the hub assembly 100 is of the same type just removed, no adjustments to the fixture 20 need to be made. Once the hub assembly is placed in the jig 104, there is proper alignment between the support block 22 of the fixture and the stud 102 on the hub assembly 100, and the support block 22 and stud 102 may be slidingly engaged. If a hub assembly 100 of a different type is placed in the jig 104, only rotation of the support block 22, as described above, is required to provide proper alignment. No additional realignment of the fixture 20 or the hub assembly 100 is required. As a result, many hub assemblies 100 may be efficiently worked on in an assembly line process due to the quick, precise and repeatable manner in which individual hub assemblies 100 are secured in place by the fixture 20 of the present invention.

Instead of providing a housing that comprises a slider and a frame, the housing may be fabricated in a single piece. The locking pin may be threaded and the bores on the post of the support block provided with matching threads or alternatively other locking functions for the locking pin may be used such as including a spring loaded ball bearing at the end of the locking pin and a receptor within the bore on the support block.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A fixture for supporting a vehicle hub assembly for movement between multiple positions, the fixture comprising:
   a base having an upper surface;
   a linearly movable housing, slidably supported on said base;
   an adjustable support block supported by said movable housing, said support block defining at least one bore for slidably receiving a stud from the hub assembly; and
   a handle for moving said housing along said base.

2. The fixture of claim 1, wherein said handle is pivotally attached to said movable housing.

3. The fixture of claim 1, wherein said movable housing comprises a slider supporting a frame.

4. The fixture of claim 1, wherein said housing defines a vertical bore into which a post on said support block fits.

5. The fixture of claim 4, further including a locking pin and wherein said housing includes a horizontal bore, and wherein said support block post includes a horizontal bore whereby to lock said support block in place said locking pin is placed through the horizontal bore in said housing and then into the horizontal bore in said support block.

6. The fixture of claim 1, wherein said base defines a linear channel and said housing defines a flange that fits within said channel.

7. The fixture of claim 1, wherein said support block defines first and second bores of differing diameter, whereby said first bore is configured to receive a stud from a first type of hub assembly and said second bore is configured to receive a stud from a second type of hub assembly.

8. The fixture of claim 7, wherein said first and second bores are configured perpendicular to one another.

9. The fixture of claim 7, wherein the two bores are configured at different elevations with respect to said base.

10. The fixture of claim 1, wherein said support block includes a cube shaped section with beveled upper edges.

11. A fixture for supporting a vehicle hub assembly for movement between multiple positions, the fixture comprising:
    a base having an upper surface;
    a linearly movable housing, slidably supported on said base;
    a handle for moving said housing along said base; and
    an adjustable support block supported by said movable housing, said support block defining at least one bore for slidably receiving a stud from a hub assembly, whereby said bore is configured within said support block to provide accurate alignment for repeatable engagement between said bore and a stud from a corresponding hub assembly supported in a jig, as multiple hub assemblies are individually placed in the jig, worked on, and removed as part of an assembly line process.

12. The fixture of claim 11, wherein the support block defines first and second bores for slidably receiving studs from first and second hub assembly types, whereby said each of said first and second bores are configured within said support block to provide accurate alignment and repeatable engagement between said first bore and a hub assembly of a corresponding first type and solely via rotation of the support block, accurate alignment and repeatable engagement between said second bore and a hub assembly of a second type, as multiple hub assemblies of differing types are individually placed in the jig, worked on, and removed within an assembly line process.

13. A method of supporting a vehicle hub assembly for movement between multiple positions, comprising the steps of:
- providing a fixture including:
  - a base having an upper surface;
  - a linearly movable housing, slidably supported on said base;
  - an adjustable support block supported by said movable housing, said support block defining at least one bore for slidably receiving a stud from a hub assembly; and
  - a handle for moving said housing along said base;
- inserting a stud of the vehicle hub assembly into one of said bores on said support block by advancing said movable housing along said base; and
- rotating said vehicle hub assembly around said stud.

14. The method of claim 13, further including the step of supporting said fixture and the hub assembly upon a jig.

15. The method of claim 14, further including the steps of adjusting said support block by:
- removing a locking pin that is inserted into said housing and said support block;
- after removal of said locking pin, rotating said support block; and
- replacing said locking pin.

16. The method of claim 14, further including the step of removing the hub assembly from said jig and placing a second hub assembly within said jig and inserting a stud of the said second hub assembly into one of said bores on said support block wherein said bore is configured within said support block to provide accurate alignment for engagement between the bore and the stud in said second hub assembly.

* * * * *